US012320638B2

United States Patent
Huang et al.

(10) Patent No.: US 12,320,638 B2
(45) Date of Patent: Jun. 3, 2025

(54) REDUCED OFFSET ERROR CONFIGURATION FOR A ROTARY INDUCTIVE SENSOR

(71) Applicant: CTS Corporation, Lisle, IL (US)

(72) Inventors: Xiaofeng Huang, Chicago, IL (US); Kevin Wolschlager, Elkhart, IN (US)

(73) Assignee: CTS Corporation, Lisle, IL (US)

( * ) Notice: Subject to any disclaimer, the term of this patent is extended or adjusted under 35 U.S.C. 154(b) by 58 days.

(21) Appl. No.: 18/047,174

(22) Filed: Oct. 17, 2022

(65) Prior Publication Data
US 2024/0125586 A1    Apr. 18, 2024

(51) Int. Cl.
*G01B 7/30*        (2006.01)
*B60K 23/02*       (2006.01)

(52) U.S. Cl.
CPC ............... *G01B 7/30* (2013.01); *B60K 23/02* (2013.01); *B60W 2420/506* (2013.01)

(58) Field of Classification Search
CPC ........ B60K 23/02; B60K 35/00; B60K 35/10; B60K 35/60; B60K 6/365; B60K 35/22; B60K 6/547; B60K 6/387; B60K 35/29; B60K 6/52; B60K 2001/001; B60K 2007/0038; B60K 2001/005; B60W 2420/506; G01B 7/30; G01D 5/2086; G01D 5/145; G01D 21/00; G01D 21/02; G01D 11/245; G01D 18/00; G01D 11/30;
(Continued)

(56) References Cited

U.S. PATENT DOCUMENTS 5,239,288 A * 8/1993 Tsals ................... G01D 5/2086
                                                    336/200
8,508,242 B2 * 8/2013 Shao ................... G01D 5/2225
                                                    324/654
(Continued)

FOREIGN PATENT DOCUMENTS

CN         104661850      *   3/2018
EP         0446181 A2         9/1991
(Continued)

OTHER PUBLICATIONS

International Search Report and Written Opinion for Application No. PCT/US2023/075359 dated Jan. 3, 2024 (14 pages).
(Continued)

*Primary Examiner* — Vinh P Nguyen
(74) *Attorney, Agent, or Firm* — Michael Best & Friedrich LLP (57) ABSTRACT

Systems and methods for a vehicle pedal assembly and an inductive sensor assembly thereof. The inductive sensor assembly includes a rotary inductive sensor target and a printed circuit board (PCB) positioned opposite the rotary inductive sensor target. The inductive sensor assembly includes a first inductive sensor circuit defined on the PCB. The first inductive sensor circuit includes a first coil circuit including a first coil having a first electrical current in a first flow direction and a second electrical coil having a second current in a second flow direction opposite to the first flow direction. The first inductive sensor circuit is configured such that a rotation of the rotary inductive sensor target induces a change in the first electrical current and the second electrical current within the first coil and the second coil.

12 Claims, 10 Drawing Sheets

(58) Field of Classification Search
CPC ...... G06F 3/0412; G06F 1/3206; G06F 1/266; G06F 2212/1016; G01V 8/20; G01V 8/10; G01V 1/50; G01V 1/28; G02B 27/0172; G02B 27/0101; G02B 6/43; G02B 6/4206; G02B 6/262; G11C 16/26; G11C 11/5642; G11C 11/1673; G11C 29/44; H01F 38/14; H01F 27/28; G01R 31/52; G01R 31/00; G01R 19/0092; G01R 31/3835; G01R 31/389; G01R 21/133; G01R 19/2513; G01R 31/006; G01R 33/02; G01R 19/00; G01R 23/16
See application file for complete search history.

(56) References Cited

U.S. PATENT DOCUMENTS

| | | | | |
|---|---|---|---|---|
| 8,742,715 | B2* | 6/2014 | Ortman | G01D 5/2073 |
| | | | | 310/68 B |
| 9,470,505 | B2* | 10/2016 | Ely | G01B 7/30 |
| 9,684,331 | B2* | 6/2017 | Hallberg | B60T 7/042 |
| 10,921,155 | B2* | 2/2021 | Shaga | G01D 3/08 |
| 11,614,765 | B2* | 3/2023 | Miller | G05G 1/44 |
| | | | | 74/514 |
| 2013/0320967 | A1* | 12/2013 | Honda | G01D 5/145 |
| | | | | 324/207.2 |
| 2019/0094047 | A1 | 3/2019 | Utermoehlen et al. | |
| 2021/0255657 | A1 | 8/2021 | Miller et al. | |

FOREIGN PATENT DOCUMENTS

| | | |
|---|---|---|
| WO | 2021163128 A1 | 8/2021 |
| WO | 2022023550 A2 | 2/2022 |

OTHER PUBLICATIONS

Korean Patent Office. Office Action for Application No. 10-2025-7010755, dated Apr. 21, 2025 (6 pages with machine translation).

* cited by examiner

REDUCED OFFSET ERROR CONFIGURATION FOR A ROTARY INDUCTIVE SENSOR

BACKGROUND OF THE INVENTION

Rotary inductive sensors may be used in a variety of applications. One application for rotary inductive sensors is sensing a position of a vehicle pedal, for example a brake pedal or an accelerator pedal.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, and aspects of concepts that include the claimed subject matter and explain various principles and advantages of those embodiments, examples, and aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

In some instances, the apparatus and method components have been represented where appropriate by conventional symbols in the drawings, showing only those specific details that are pertinent to understanding the examples, features, and aspects illustrated so as not to obscure the disclosure with details that will be readily apparent to those of ordinary skill in the art having the benefit of the description herein.

DETAILED DESCRIPTION OF THE INVENTION

Rotary inductive position sensors (referred to herein as "rotary inductive sensors"), utilize one or more inductive coil circuits to provide information about a rotational angle or position of a target. In particular, an induced change in an electromagnetic field of the inductive coil circuits is generated in response to a rotational movement of the target and the resulting current and/or voltage signal is output by the sensor. The particular electrical properties (e.g., the voltage and/or current magnitude and polarity) is then analyzed (for example, via an electronic processor of an electronic controller) to determine the change in rotational position. Some rotary inductive sensors may include multiple coil circuits and be configured to output more than one signal for each circuit (for example, redundant rotary inductive sensors may provide two outputs).

The accuracy of the rotary inductive sensor may be negatively impacted due to electromagnetic interference/cross-talk caused by the environment or the particular configuration of the inductive coil circuit of the rotary inductive sensor. For example, electromagnetic field strength along the electrical traces of a transmitter coil circuit of the rotary inductive sensor may be higher in certain places than in a center of the transmitting coil (referred to as cornering effect).

One solution to address such issues may be to increase the distance between one or more of the traces and/or coil(s) of the coil circuit(s). However, such configurations may introduce more crosstalk and/or increase a coupling factor between one or more components within the sensor. Such configurations may also require more precise design and manufacturing control to ensure functionality, which may be expensive. In addition, it may also not be possible to implement spaced apart traces or coils due to a limited size of the printed circuit board (PCB) of the rotary inductive sensor.

Thus, the systems and methods described herein provide, among other things, for a configuration for a rotary inductive sensor for reducing an offset error of measurement signals generated therefrom (for example, caused by a cornering effect of a transmitter coil circuit of the sensor).

One example provides a vehicle pedal assembly including a pedal rotatable relative to a shaft and a rotary inductive position sensor. The rotary inductive position sensor includes a rotary inductive sensor target rotatable in response to the rotation of the pedal and an inductive sensor assembly. The inductive sensor assembly includes a printed circuit board (PCB) positioned opposite the rotary inductive sensor target. The inductive sensor assembly includes a first inductive sensor circuit defined on the PCB. The first inductive sensor circuit includes a first coil circuit including a first coil having a first electrical current in a first flow direction and a second electrical coil having a second current in a second flow direction opposite to the first flow direction. The first inductive sensor circuit is configured such that a rotation of the rotary inductive sensor target induces a change in the first electrical current and the second electrical current within the first coil and the second coil.

Another example provides an inductive sensor assembly. The inductive sensor assembly includes a rotary inductive sensor target and a PCB positioned opposite the rotary inductive sensor target. The inductive sensor assembly includes a first inductive sensor circuit defined on the PCB. The first inductive sensor circuit includes a first coil circuit including a first coil having a first electrical current in a first flow direction and a second electrical coil having a second current in a second flow direction opposite to the first flow direction. The first inductive sensor circuit is configured such that a rotation of the rotary inductive sensor target induces a change in the first electrical current and the second electrical current within the first coil and the second coil.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

It should also be understood that, while the examples are described herein in regard to vehicle pedals (in particular, an accelerator pedal), the systems and methods described may be utilized in different applications involving rotary inductive sensors (for example, eBrake pedals). The systems and methods described herein, although described in terms of a dual output rotary inductive sensor, may be applied to rotary inductive sensors with a different number of outputs.

Figure 1:
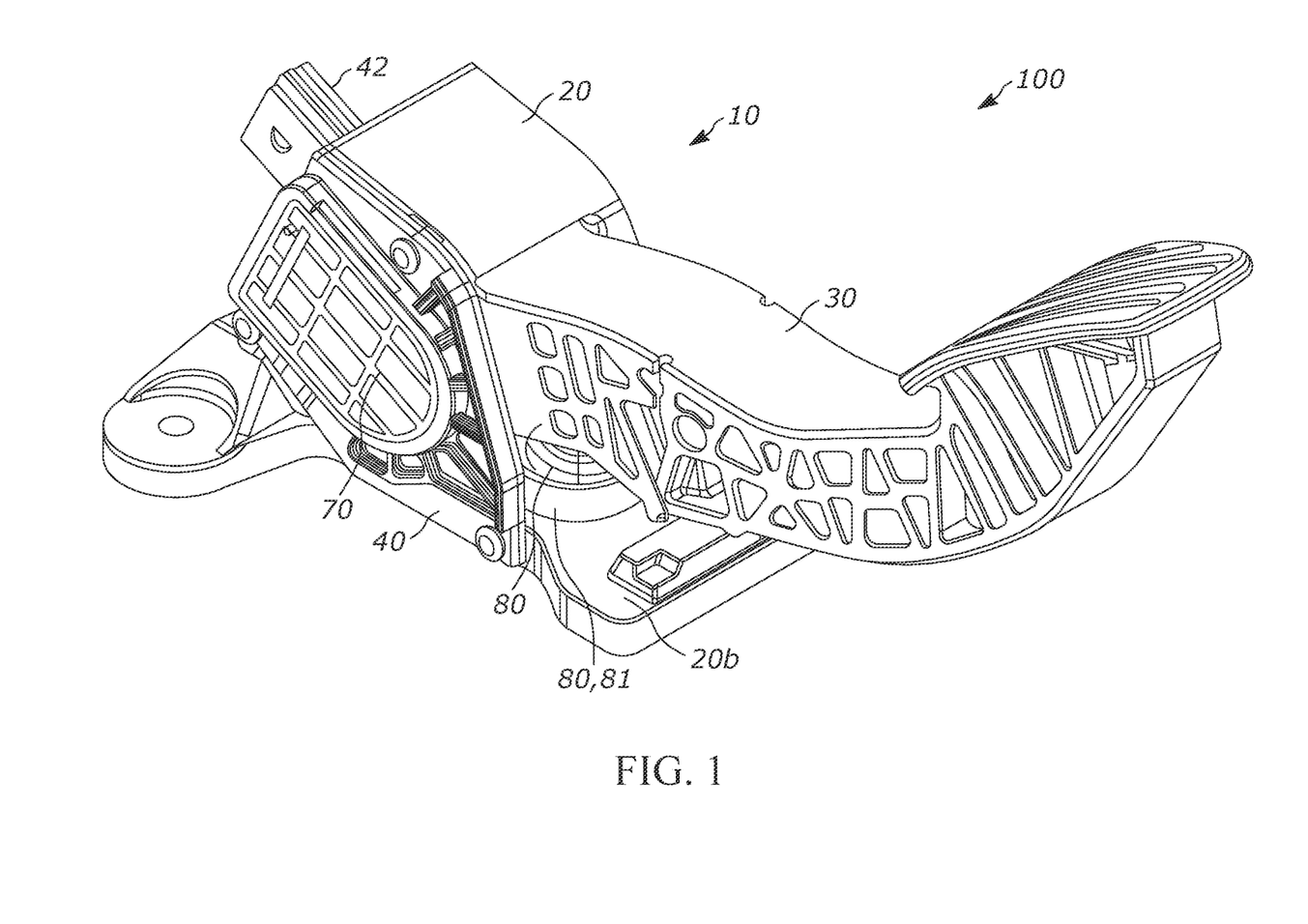
FIG. 1 illustrates a perspective view of a vehicle pedal assembly incorporating a rotary inductive sensor in accordance with some examples.
Figure 2:
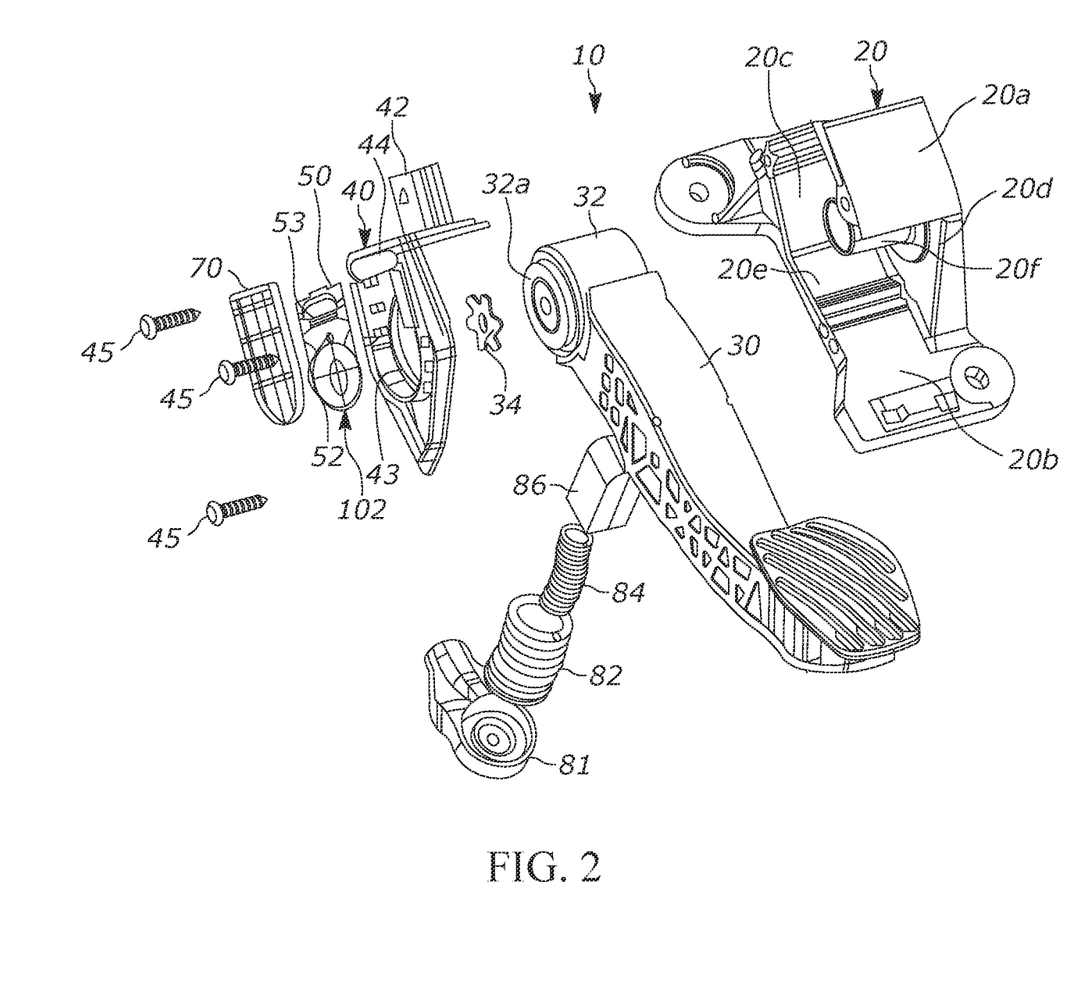
FIG. 2 is an exploded perspective view of the vehicle pedal assembly of FIG. 1 in accordance with some examples.

FIGS. 1 and 2 depict an example vehicle pedal assembly (referred to herein as vehicle pedal) 10 with a rotary inductive sensor assembly 101 including a rotary inductive sensor 102 and a rotary inductive sensor target 34, both described in more detail below. The vehicle pedal 10 includes a pedal housing 20 including a plurality of exterior walls 20A and a base 20B together defining an interior 20C, a front opening 20D, and a side opening 20E.

The vehicle pedal 10 also includes an elongate plastic pedal arm 30 that includes a distal end or drum 32 with a metal rotary inductive sensor target 34 (referred to herein as rotary sensor target) adapted to be over-molded into the exterior side face 32A of the drum 32. In the example shown, The pedal arm 30 and, more specifically, the distal end or drum 32 with the rotary inductive sensor target 34 thereon extends into the interior 20C of the pedal housing 20 into a relationship rotatable relative to the housing 20 and into a relationship surrounding and rotatable relative to a shaft 20F integral with one of the side exterior walls 20A of the housing 20 and extending into the interior 20C of the housing 20.

The pedal 10 also includes a combination electrical connector assembly and housing 40 that is secured to the pedal housing 20 in a relationship covering and closing the housing side opening 20E and, more specifically, in a relationship covering the drum 32 of the pedal arm 30 located in the interior 20C of the housing 20. The combination electrical connector assembly and housing cover 40 is also secured in a relationship opposed and spaced from the side exterior face 32a of the drum 32 of the pedal arm 30 with the rotary inductive sensor target 34 over-molded therein. A plurality of screws 45 secure the cover 40 to the housing 20.

The housing cover 40 includes an integral electrical connector 42 and defines both a central circular opening 43 and an interior recess 44 surrounding the opening 42. The housing cover 40 and the pedal arm 30 are positioned relative to each other in a relationship with the rotary inductive sensor target 34 on the drum 32 of the pedal arm 30 extending into and located in the circular opening 43 defined in the housing cover 40 when the housing cover 40 is secured to the housing 20.

The pedal 10 also includes a rotary inductive sensor substrate or printed circuit board (PCB) 50 that includes opposed exterior faces 52 and 54. The PCB 50 is configured to be inserted into, located, and seated in the recess 44 defined in the housing cover 40 and positioned in a relationship opposed and adjacent the rotary inductive sensor target 34 on the drum 32 of the pedal arm 30 and, as illustrated, with the exterior face 54 of the PCB 50 facing the rotary inductive sensor target 34. The PCB 50, as described in more detail below, includes respective inductive sensor transmitter and receiver coil circuits defined and formed on the respective exterior front and back faces 52 and 54. A plastic electrical cover or plate 70 covers the PCB 50 and is secured to the exterior face of the housing cover 40. The inductive sensor assembly 101 of the pedal 10 includes the rotary inductive sensor target 34 on the drum 32 of the pedal arm 30 and the rotary inductive sensor 102 (explained in more detail below).

The pedal 10 further includes a pedal friction assembly 80 in the interior 20c of the housing 20. The pedal friction assembly 80 includes a friction device 81 seated on and adapted for pivotal movement relative to the base 22 of the pedal housing 20. A pair of telescoping springs 82 and 84 extend between the pedal friction assembly 80 and the underside of the elongate pedal arm 30. A spring damper 86 is adapted to be wedged between the two springs 82 and 84.

Electrical power is provided to the rotary inductive sensor 102 from an power source (for example, a power source that is connected to or is part of an electronic controller such as the controller of FIG. 6 described in more detail below), providing current to the transmitter coil circuit of the rotary inductive sensor 102. The transmitter coil circuits, as explained in more detail below, include a plurality of transmitting coils. The current flows through the transmitting coils, also generating a magnetic field around the coils. The receiver coil circuits also include a plurality of receiving coils that are positioned such that the magnetic field generated by the transmitting coils induces a current within the receiving coils (and thus, a respective magnetic field thereof). The electrical signal induced in the receiving coils is then provided from the sensor 102 to an electronic controller (not shown). Due to the positioning of the rotary inductive sensor 102, the rotary inductive sensor target 34 is positioned within the generated magnetic field. The application or removal of a force to and from the pedal arm 30 (for example, from a foot of a user) during the operation of a vehicle (not shown) results in the movement/rotation of the pedal arm 30 which in turn results in the movement/rotation of the pedal arm drum 32 in the interior 20C of the pedal housing 20 which results in the movement/rotation of the rotary inductive sensor target 34.

The movement/rotation of the rotary inductive sensor target 34 relative to the inductive sensor 102 transmitter and receiver coil circuits of the rotary inductive sensor 102 results in a change in the magnetic field generated by the respective transmitter coil circuits of the rotary inductive sensor 102. The movement of the rotary inductive sensor target 34 thus also results in a change in the voltage and/or current in the respective receiver coil circuits of the rotary inductive sensor 102. The resulting change in the electrical signal provided to the electronic controller is then utilized, by the controller (for example, the electronic controller 600 of FIG. 6), to determine a position of the pedal arm 30 and accordingly control one or more operations of the vehicle (for example, the acceleration and deceleration of the vehicle).

Figure 6:
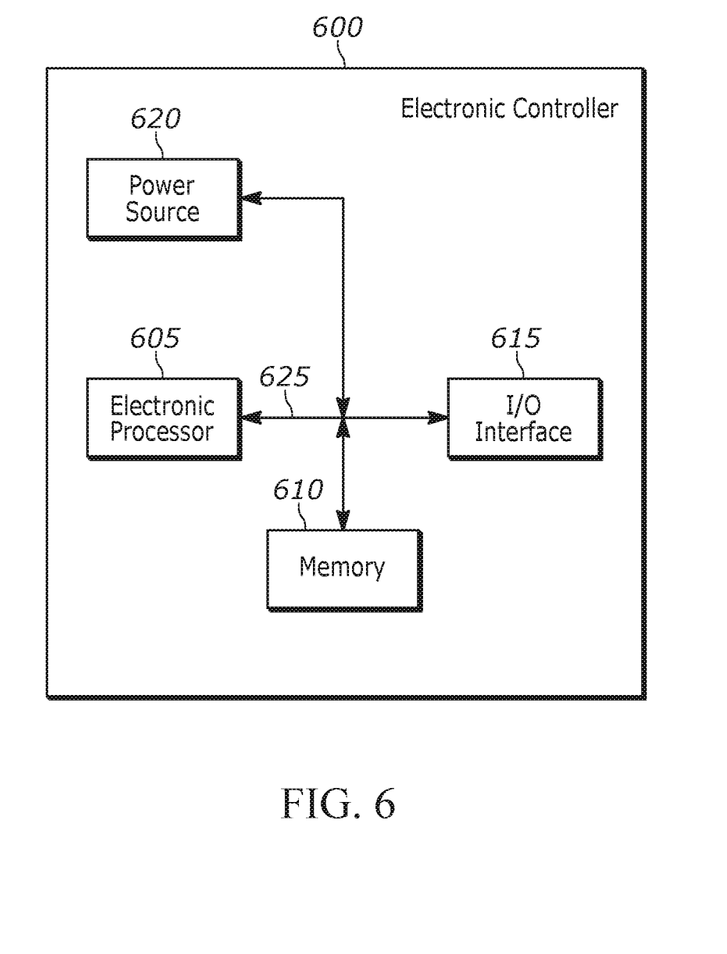
FIG. 6 is a schematic diagram of an electronic controller of the vehicle pedal assembly of FIG. 1 according to some examples.

FIG. 6 schematically illustrates one example embodiment of an electronic controller 600. In the embodiment illustrated, the electronic controller 600 includes an electronic processor 605, a memory 610, an input/output interface 615, and a power source 620. The illustrated components, along with other various modules and components are connected to each other by or through one or more control or data buses (for example, the bus 625) that enable communication therebetween. The electronic controller 600 may be housed in a single device (for example, an application-specific integrated circuit (ASIC)) or distributed across a plurality of devices.

The electronic processor 605 may include one or more microprocessors, an ASIC, or another suitable electronic device. The electronic processor 605 obtains and provides information (e.g., to and from the memory 610 and/or the input/output interface 615) and processes the information by executing one or more software instructions or modules, capable of being stored, for example, in a random access memory ("RAM") area of the memory 610, a read only memory ("ROM") of the memory 610, or another non-transitory computer readable medium (not shown). The software can include firmware, one or more applications, program data, filters, rules, one or more program modules, and other executable instructions. The electronic processor 605 is configured to retrieve from the memory 610 and execute, among other things, software related to processes and methods described herein.

The electronic processor 605 is configured to control the input/output interface 615 to transmit and receive communication and/or power signals (for example, via one or more switches, which are not shown) to and from at least one other device (for example, the rotary inductor sensor 102). The input/output interface 615 may include various digital and analog components (for example, digital signal processors, high band filters, low band filters, and the like), which for brevity are not described herein and which may be implemented in hardware, software, or a combination of both. The input/output interface 615 may include, for example, a transceiver, a transmitter, and/or a receiver (not shown). The input/output interface 615 may alternatively or additionally include one or more ports for wired communications with a respective component (for example, the rotary inductive sensor 102). In some embodiments, the electronic processor 605 is configured to provide current (from the power source 620) to power the transmitter coil circuits of the rotary inductor sensor 102. The power source 620 may be part of the electronic controller 600 itself or is a separate source from one or more electrical systems of the vehicle.

In some embodiments, the electronic controller 600 is configured to operate and receive signals from the rotary inductive sensor 102. Based on the received signals, as described above, the controller 600 determines a position, a speed, and/or a change in position of the rotary inductive sensor target 34 (and, thus, of the pedal arm 30). The electronic controller 600, in one example, provides the derived information to one or more controllers of the vehicle. The one or more controller accordingly control one or more operations of the vehicle (for example, the acceleration and deceleration of the vehicle) based on the received information. In some embodiments, some or all of the functionality of the electronic controller 600 is integrated into a vehicle control unit (VCU) of the vehicle. The controller 600 may communicate information (for example, the determined position, speed, and/or change in position determined from a signal from the rotary inductive sensor 102) to a VCU or another controller of the vehicle to perform an operation of the vehicle based on the derived information. In some embodiments, some or all of the functionality of the electronic controller 600 is integrated into the rotary inductive sensor 102. In some embodiments, some or all of the processing of the signals generated by the inductive sensor 102 may be performed at the electronic controller 600. In some embodiments, the rotary inductive sensor 102 may include circuitry components such as a microprocessor and memory (not shown) for performing at least a portion of processing of the generated signals (for example, to convert to an appropriate output protocol for transmission to the electronic controller 600).

Figure 3:
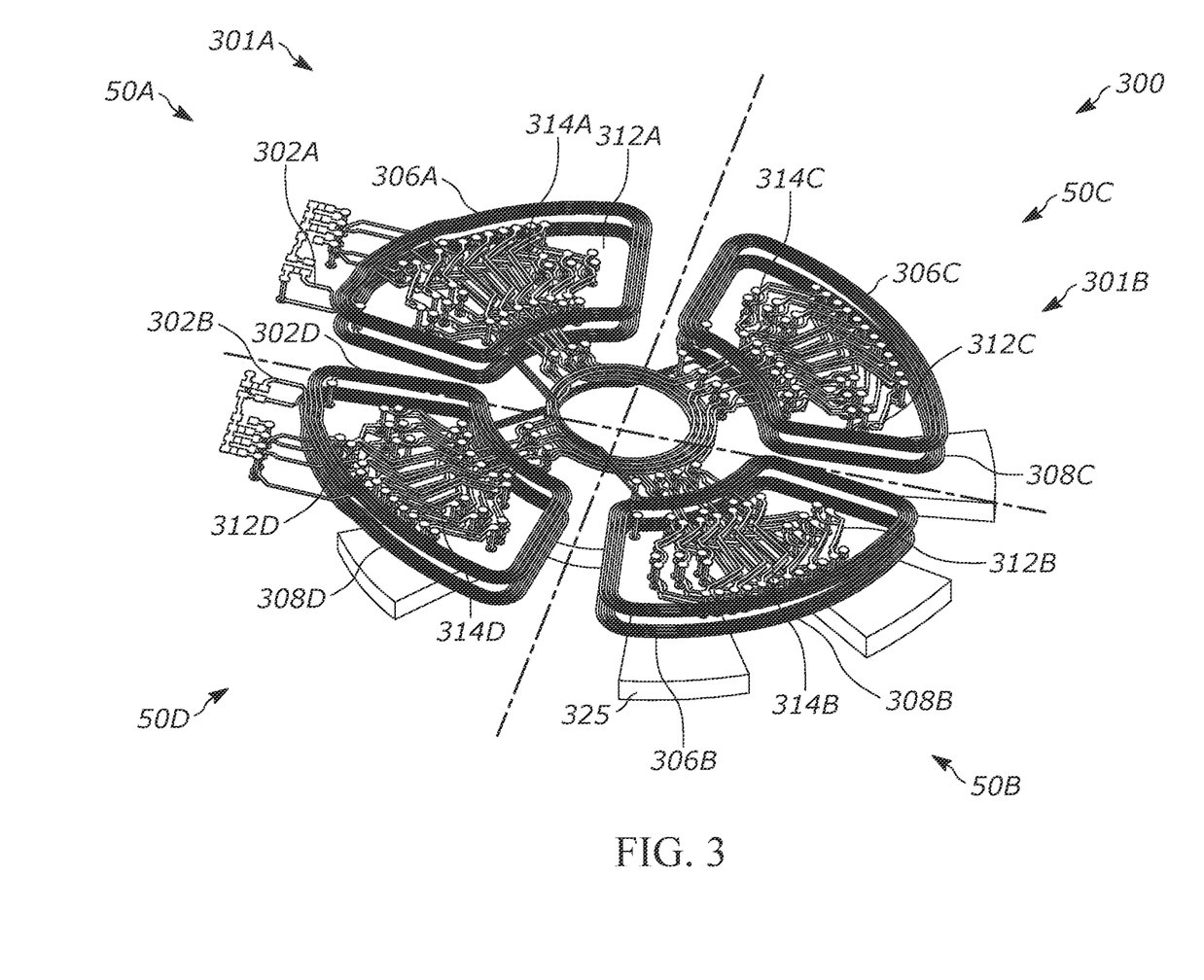
FIG. 3 is a diagram of the rotary inductive sensor of FIG. 1 in accordance with some examples.

FIG. 3 is a diagram 300 of the rotary inductive sensor 102 according to some examples. In the example illustrated, the inductive sensor 102 includes a first and a second inductive sensor circuit 301A, 301B of the PCB 50 and the rotary inductive sensor target 34 according to some instances. Each inductive sensor circuit 301A, 301B includes a transmitter coil circuit 302A, 302B and a receiver coil circuit 304A, 304B respectively. The transmitter coil circuits 302A, 302B and the receiver coil circuits 304A, 304B are respectively defined and formed on opposed exterior faces 52 and 54 of the PCB 50. The overlapping arrangement of the respective transmitter coil circuits 302A, 302B and the respective receiver coil circuits 304A, 304B on opposing faces 52, 54 of the PCB 50 results in an interaction and intermixing between the respective magnetic fields generated by the respective transmitter coil circuits 302A, 302B. This results in an increased coupling between the respective transmitter coil circuits 302A, 302B and the respective receiver coil circuits 304A, 304B.

In the example shown, each transmitter coil circuit 302A, 302B includes two transmitting coils 306A, 306B and 306C, 306D respectively. Each of the two coils 306A, 306B and 306C, 306D are connected in series. Each receiver coil circuit 304A, 304B includes two receiving coils 308A, 308B and 308C, 308D respectively. Each of the two coils 308A, 308B and 308C, 308D are connected in series.

Each transmitting coil 306A-306D and receiving coil 308A-308D are defined and formed on four different and separate sections or quadrants 50A-50D of the PCB 50. Each of the transmitting coils 306A-306D and the receiving coils 308A-308D include a respective trace 312A-312D and 314A-314D respectively. Associated electrical circuitry, components, and output integrated circuits (not shown) on the respective opposite faces 52 and 54 of the PCB 50 are electrically coupled to the respective transmitter and receiver coil circuit traces 312A-312D and 314A-314D on the respective opposed faces 52 and 54 of the PCB 50.

The particular separation between traces 312A-312D and 314A-314D of the respective transmitter coil circuit 302A, 302B and receiver coil circuit 304A, 304B provides reduced interaction or interference between the respective magnetic fields generated by the respective transmitter coil circuits 302A, 302B which results in a reduced coupling/reduced coupling factor therebetween. As mentioned above, although a corner effect may be reduced by increasing the space between the coils 306A-306D, 308A-308D (in particular, traces 312A-312D, 314A-314D), modifications to increase spacing may increase interference and crosstalk between two or more of the traces 312A-312D.

Figure 4A:
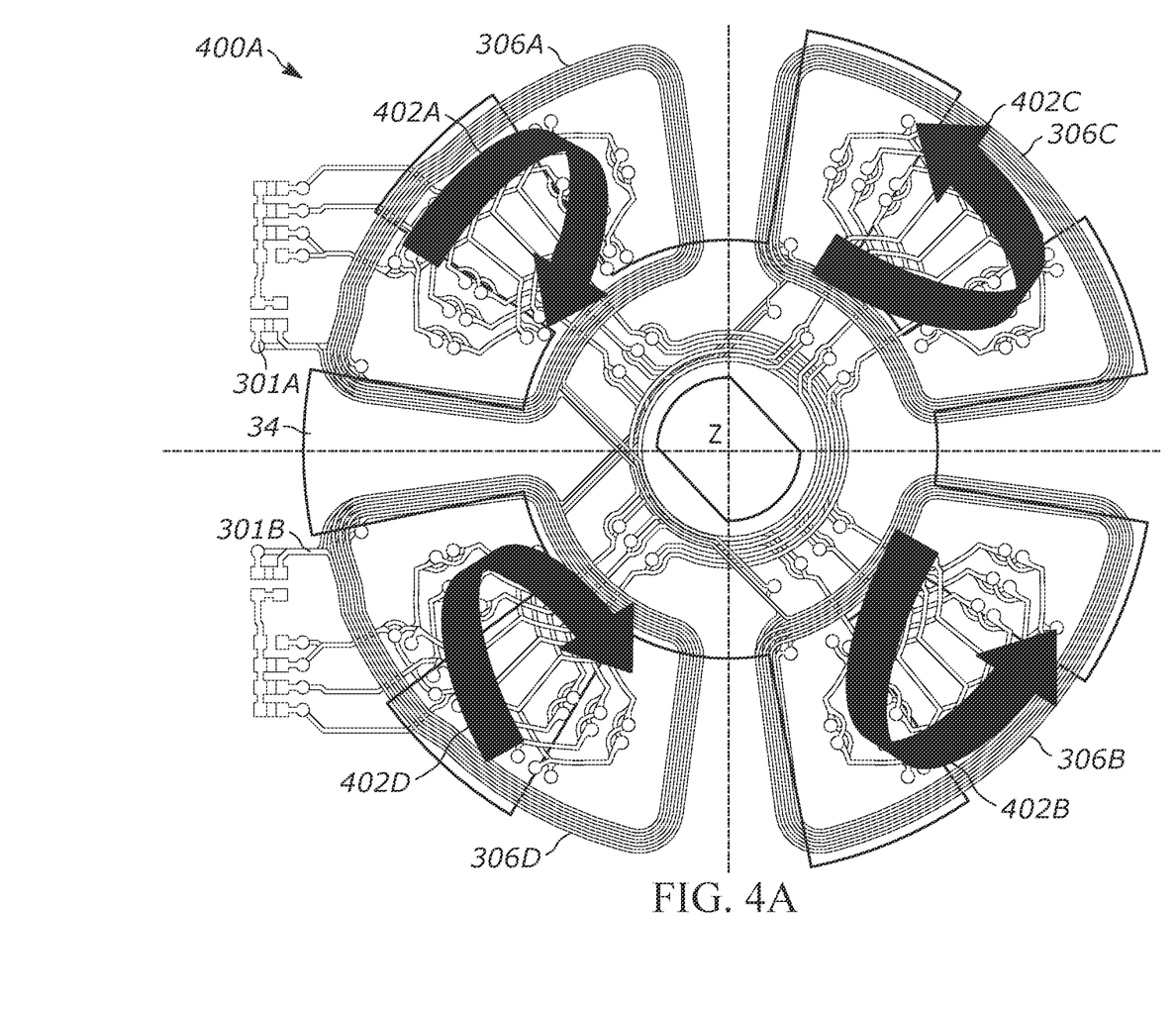
FIG. 4A is a diagram of top view of the rotary inductive sensor of FIG. 1 in accordance with some examples.

FIG. 4A is a diagram 400A of top view of the inductive sensor circuits 301A, 301B of the rotary inductive sensor 102 and the rotary inductive sensor target 34. In the example illustrated, the inductive sensor circuits 301A, 301B are configured so that the current within the transmitting coils 306A, 306D flows in a first flow direction and the current within the transmitting coils 306B, 306C flows in a second flow direction, opposite of the first flow direction (i.e. opposite polarity). The flow direction of the transmitting coils 306A-306D of the PCB 50 is indicated by arrows 402A-402D.

Figure 4B:
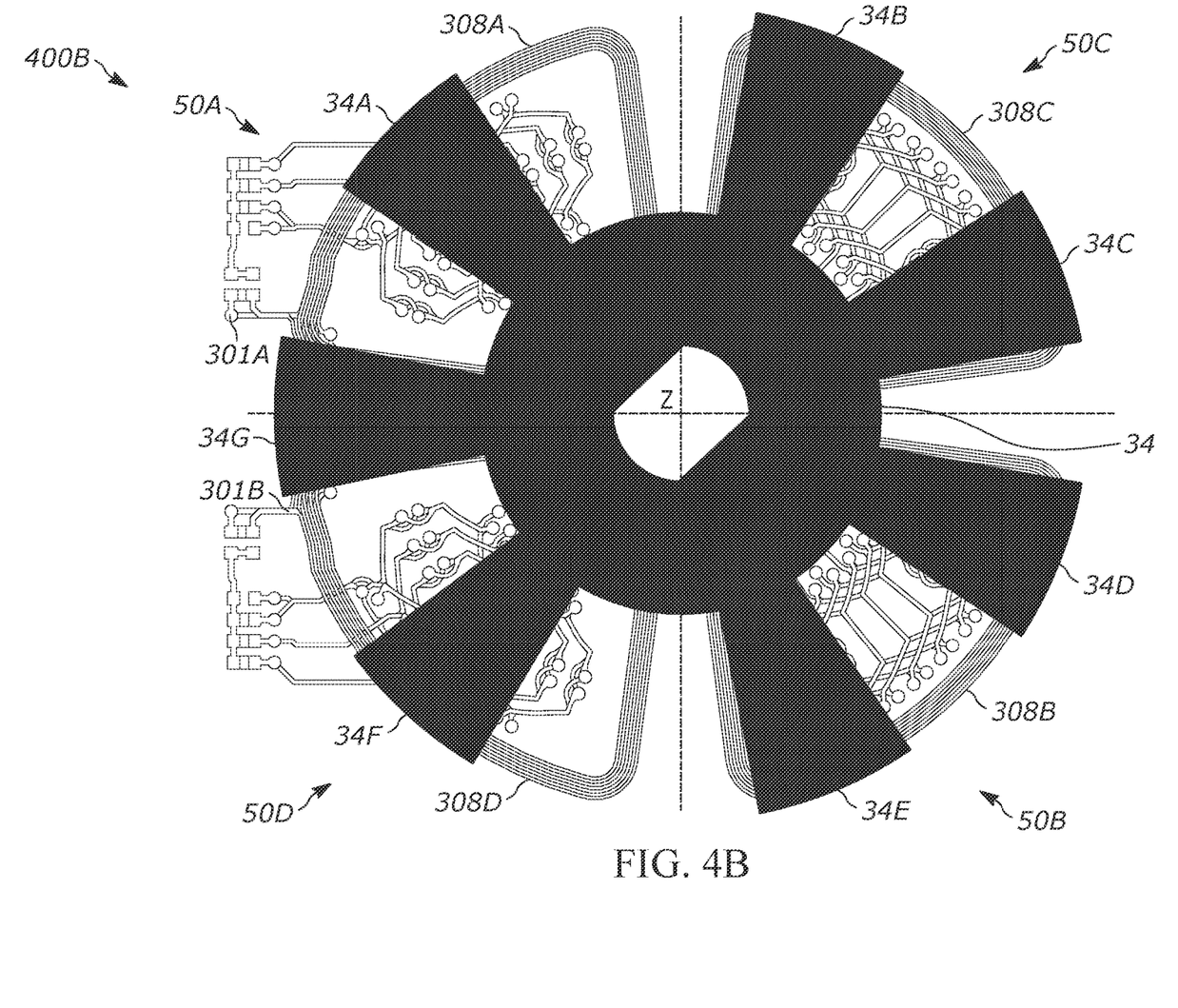
FIG. 4B is a diagram of bottom view of the rotary inductive sensor of FIG. 1 in accordance with some examples.

FIG. 4B is a diagram 400B illustrating a bottom view of the PCB 50 and the rotary inductive sensor target 34. As illustrated, the rotary inductive sensor target includes a plurality of lobes 34A-34G. Since the transmitting coils 306A-306D have opposite polarities, the rotary inductive sensor target 34 (in particular, the configuration of the lobes 34A-34F and the spacing therebetween) is configured (in this case, shaped) so that the area of the receiving coils 308A-308D covered by one or more of the lobes 34A-34F of the rotary inductive sensor target 34 is opposite for diagonally opposite quadrants 50A, 50B and 50C, 50D. For example, the area covered by lobe 34A in quadrant 50A is not covered in quadrant 50B while the area in quadrant 50B covered by lobes 34D and 34E are not covered in quadrant 50A. Lobe 34G may be included to increase an angular sensing range of the sensor.

The receiving coil signal may be interpreted by applying the following formula:

$$\text{ReceivingCoilSignal} = A\cos(\theta) + \text{Error}_{\text{offset}}$$

where A is the area of the particular receiving coil 308A-308D, θ is the relative angular position of the rotary inductive sensor target 34, and Error$_{\text{offset}}$ is the offset error of the receiving coil signal due to cornering effect.

To calculate the total receiving coil signal for a receiver coil circuit (for example, receiver coil circuit 304A), the sum of the receiving coil signal of the respective receiver coils (in the present example, coils 308A and 308B of the circuit 304A) must be determined. Below are the functions for determining the receiving coil signal for the receiver coils pair of a receiver coil circuit 304A, 304B.

$$\text{ReceivingCoilSignal}_A = A1\cos(\theta) + \text{Error}_{\text{offset}}$$

$$\text{ReceivingCoilSignal}_B = A3\cos(\theta) - \text{Error}_{\text{offset}}$$

The offset error of the second receiver coil of the receiver coil circuit 304A, 304B is negative due to the opposite polarity of the transmitting coil of the respective quadrant (for example, for receiving coil 308B, the transmitting coil 306B). Because the separation between the transmitting coils and the receiving coils are approximately symmetrical in both quadrants of the respective inductive sensor circuit 301A, 301B, the magnitude of the offset error is approximately equal. Thus, the receiving coil signal for a single receiver coil circuit 304A, 304B may be approximated as:

$$\text{ReceivingCoilSignal}_{Total} = (A1+A3)\cos(\theta)$$

Thus, by adjusting the configuration of the rotary inductive sensor target 34 and driving the transmitting coils 306A, 306B and 306C, 306D of a respective transmitter coil circuit 302A, 302B to be of opposite polarity with each other, the offset error may be reduced.

Figure 4C:
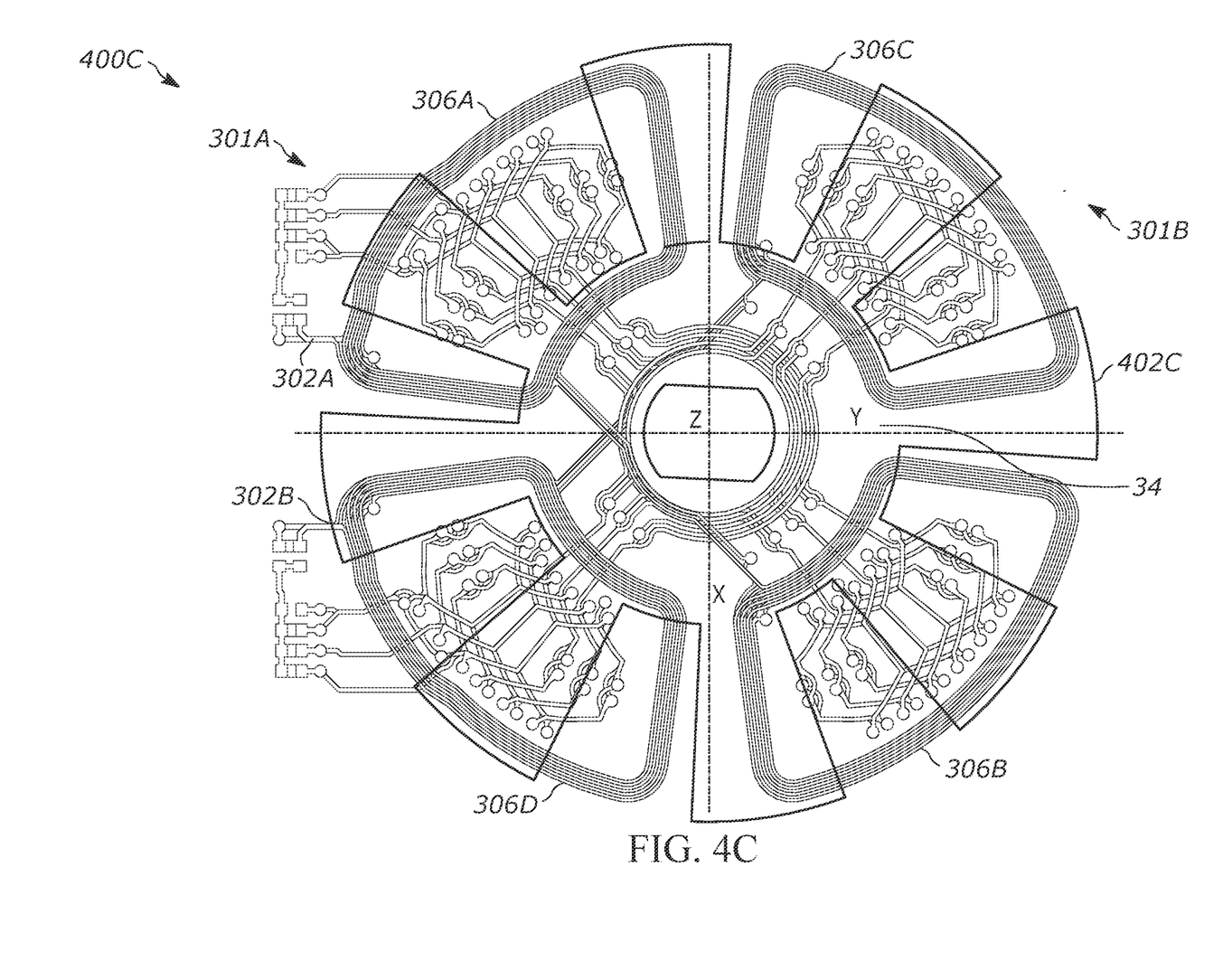
FIG. 4C is a diagram of a top view of a rotary inductive sensor in accordance with some examples.

FIG. 4C is a diagram 400C of top view of the inductive sensor circuits 301A, 301B of the PCB 50 and a rotary inductive sensor target 402C. In the example illustrated, the current flow direction of the transmitting coils 306A-306D of the PCB 50 is the same. In other words, current provided to each of the two transmitting coils 306A, 306B and 306C, 306D of the respective inductive sensor circuit 301A, 301B flows in the same direction (same polarity). As illustrated, the rotary inductive sensor target 402C is configured differently from the target 34 in order to accommodate for the polarities of the respective coils 306A-306D.

Figure 5A:
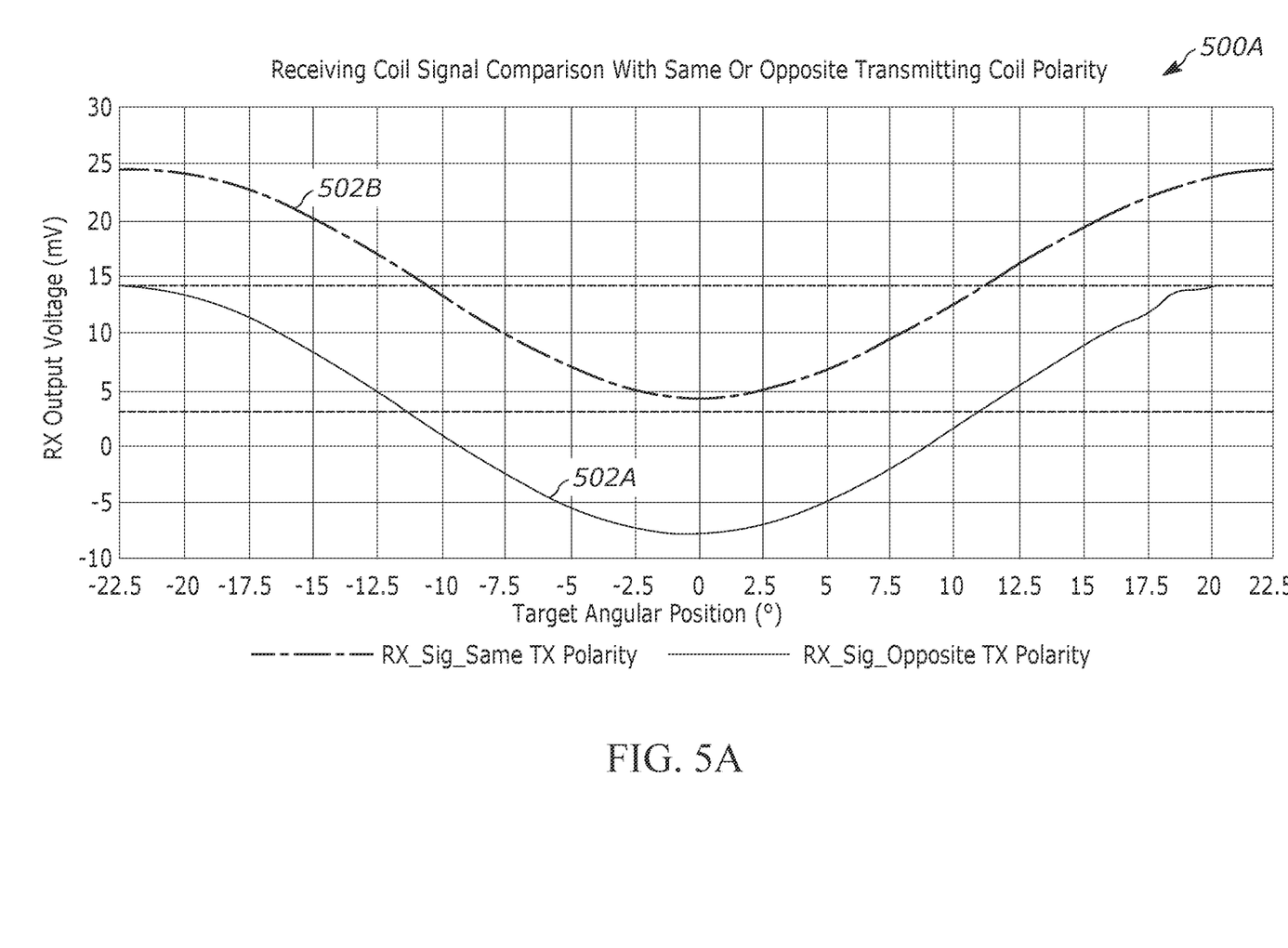
FIG. 5A is a chart displaying simulation results of an offset error of a receiving coil signal generated by the rotary inductive sensor of FIG. 1 in accordance with some examples.

FIG. 5A is a chart 500A displaying simulation results of the offset error in the receiving coil signal for both cases where the transmitting coils 306A, 306B and 306C, 306D are of opposite polarity (line 502A) and where the transmitting coils 306A, 306B and 306C, 306D are of the same polarity (line 502B). The chart 500 illustrates the receiving coil signal of an inductive sensor circuit (for example, circuits 301A and 301B) over the angular position of the target. As illustrated, the offset error (approximately 3.2 mV) of the opposite polarity implementation is less than the offset error (approximately 14.4 mV) of the same polarity implementation.

Figure 4D:
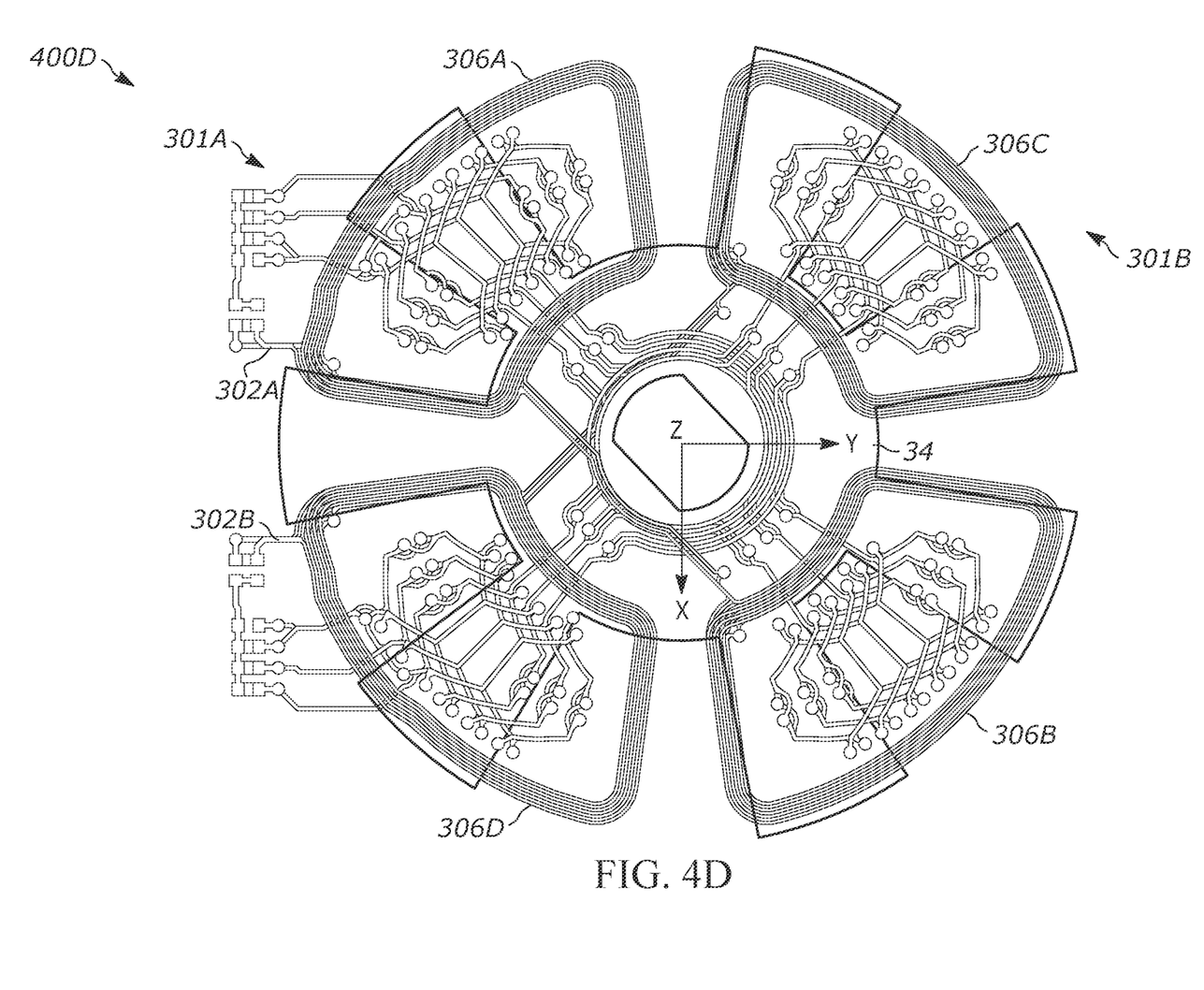
FIG. 4D is a diagram of another configuration of the rotary inductive sensor of FIG. 1 in accordance with some examples.

Alternatively, the inductive sensor circuits 301A, 301B may be configured so that the polarities of the receiving coils 308A, 308B and 308C, 308D are of opposite polarities rather than the transmitting coils 306A, 306B and 306C, 306D. FIG. 4D illustrates a diagram 400D of an example configuration of the inductive sensor circuits 301A, 301B of the PCB 50 and the target 34 according to some embodiments. In the illustrated embodiment, the inductive sensor circuits 301A, 301B are configured so that the current induced within the receiving coils 308A, 308B and 308C, 308D flows opposite of each other (opposite polarity).

Figure 5B:
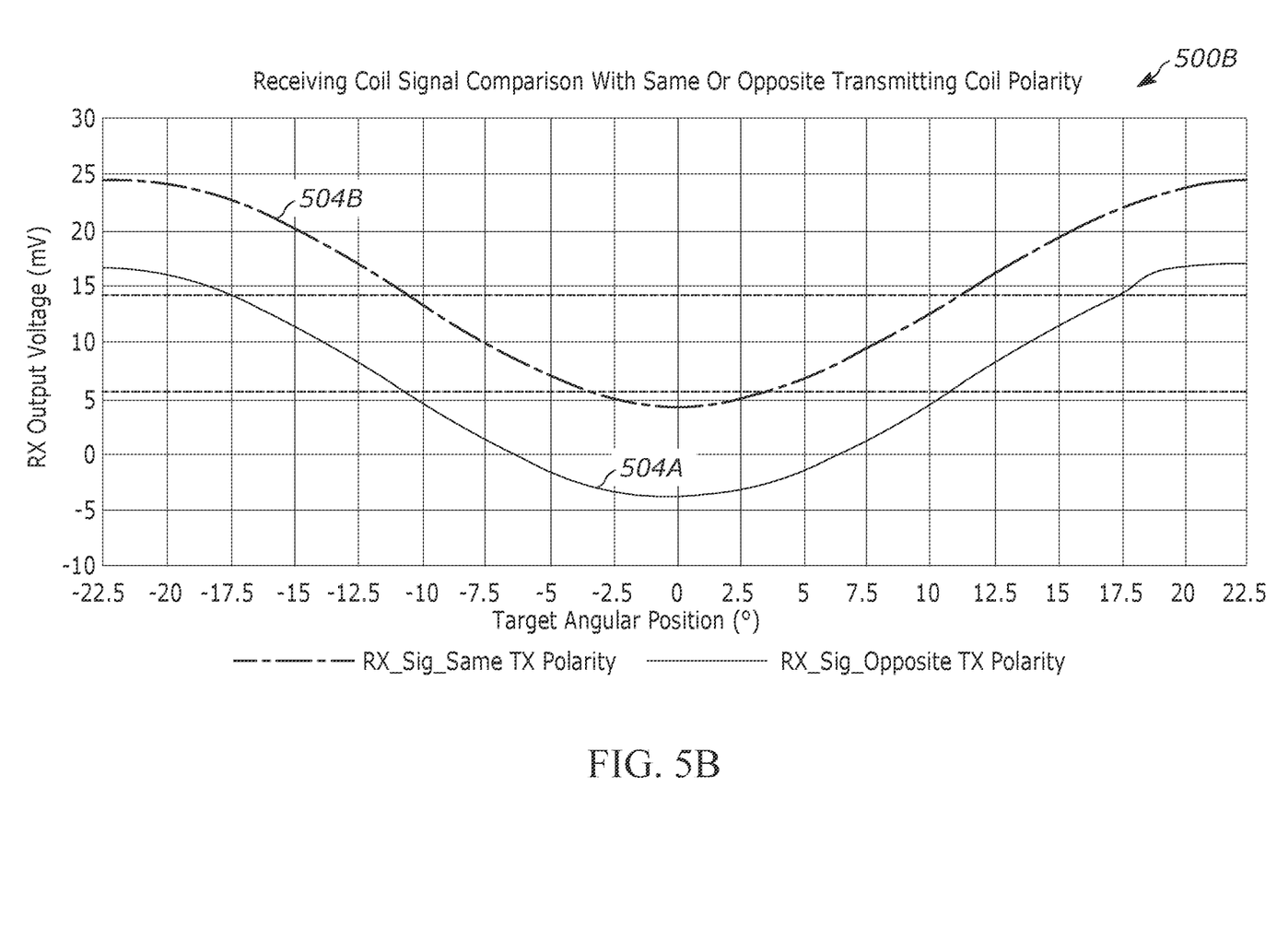
FIG. 5B is a chart displaying simulation results of an offset error of a receiving coil signal generated by the rotary inductive sensor of FIG. 1 in accordance with some examples.

FIG. 5B is a chart 500B displaying simulation results of the offset error in the receiving coil signal for both cases where the receiving coils 308A, 308B and 308C, 308D are of opposite polarity (line 504A) and where the receiving coils 308A, 308B and 308C, 308D are of the same polarity (line 504B). The chart 500B illustrates the receiving coil signal of an inductive sensor circuit (for example, circuits 301A and 301B) over the angular position of the target. As illustrated, the offset error (approximately 6.6 mV) of the opposite polarity implementation is less than the offset error (approximately 14.4 mV) of the same polarity implementation.

In the foregoing specification, various embodiments, examples, aspects, and features have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

We claim:

1. A vehicle pedal assembly comprising:
a pedal rotatable relative to a shaft; and
a rotary inductive position sensor including:
a rotary inductive sensor target rotatable in response to the rotation of the pedal, the rotary inductive sensor target including a plurality of lobes, and
an inductive sensor assembly including a printed circuit board (PCB) positioned opposite the rotary inductive sensor target, the inductive sensor assembly including a first inductive sensor circuit defined on the PCB, the first inductive sensor circuit including a first coil circuit including a first coil having a first electrical current in a first flow direction and a second coil circuit including a second coil having a second electrical current in a second flow direction opposite to the first flow direction,
wherein the first inductive sensor circuit is configured such that a rotation of the rotary inductive sensor target induces a change in the first electrical current and the second electrical current within the first coil and the second coil, and
wherein the rotary inductive sensor target is configured such that a first area of the PCB within a first quadrant of the rotary inductive sensor target is covered by a first subset of the plurality of lobes and a second area of the PCB opposite of the first area is uncovered, the second area being within a second quadrant of the rotary inductive sensor target diagonal from the first quadrant.

2. The assembly of claim 1, wherein the first coil and the second coil are transmitter coils.

3. The assembly of claim 1, wherein the first coil and the second coil are receiver coils.

4. The assembly of claim 1, wherein the inductive sensor assembly includes a second inductive sensor circuit defined on the PCB, the second inductive sensor circuit including a third coil circuit including a third coil having a third electrical current in a third flow direction and a fourth coil circuit including a fourth coil having a fourth electrical current in a fourth flow direction opposite to the third flow direction, wherein the second inductive sensor circuit is configured such that a rotation of the rotary inductive sensor target induces a change in the third electrical current and the fourth electrical current.

5. The assembly of claim 4, wherein the first coil, the second coil, the third coil, and the fourth coil are transmitter coils.

6. The assembly of claim 4, wherein the first coil, the second coil, the third coil and the fourth coil are receiver coils.

7. An inductive sensor assembly comprising:
a rotary inductive sensor target including a plurality of lobes; and
a printed circuit board (PCB) positioned opposite the rotary inductive sensor target, the inductive sensor assembly including a first inductive sensor circuit defined on the PCB, the first inductive sensor circuit including a first coil circuit including a first coil having a first electrical current in a first flow direction and a second coil circuit including a second coil having a second electrical current in a second flow direction opposite to the first flow direction, wherein the first inductive sensor circuit is configured such that a rotation of the rotary inductive sensor target induces a change in the first electrical current and the second electrical current within the first coil and the second coil, and wherein the rotary inductive sensor target is configured such that a first area of the PCB within a first quadrant of the rotary inductive sensor target is covered by a first subset of the plurality of lobes and a second area of the PCB opposite of the first area is uncovered, the second area being within a second quadrant of the rotary inductive sensor target diagonal from the first quadrant.

8. The assembly of claim 7, wherein the first coil and the second coil are transmitter coils.

9. The assembly of claim 7, wherein the first coil and the second coil are receiver coils.

10. The assembly of claim 7, wherein the inductive sensor assembly includes a second inductive sensor circuit defined on the PCB, the second inductive sensor circuit including a second coil circuit including a third coil having a third electrical current in a third flow direction and a fourth coil having a fourth electrical current in a fourth flow direction opposite to the third flow direction, wherein the second inductive sensor circuit is configured such that a rotation of the rotary inductive sensor target induces a change in the third electrical current and the fourth electrical current.

11. The assembly of claim 10, wherein the first coil, the second coil, the third coil, and the fourth coil are transmitter coils.

12. The assembly of claim 10, wherein the first coil, the second coil, the third coil and the fourth coil are receiver coils.

\* \* \* \* \*